Jan. 12, 1965  W. T. SORENSON  3,165,604
THREE-POSITION SINGLE TOGGLE ACTUATED SWITCH
FOR TWO INDEPENDENT ELECTRICAL CIRCUITS
Filed Feb. 26, 1963  3 Sheets-Sheet 1
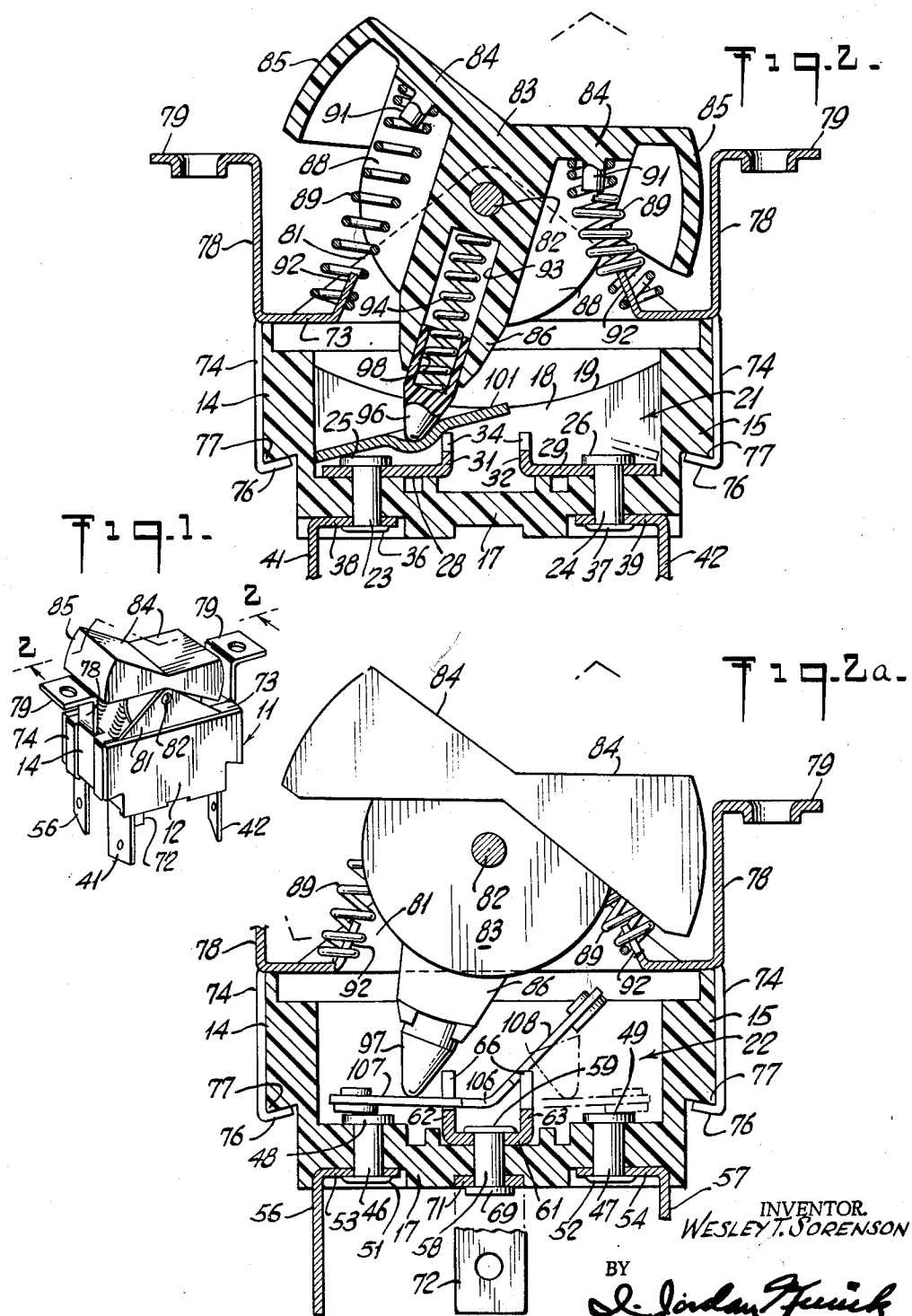
INVENTOR.
WESLEY T. SORENSON
BY
ATTORNEY

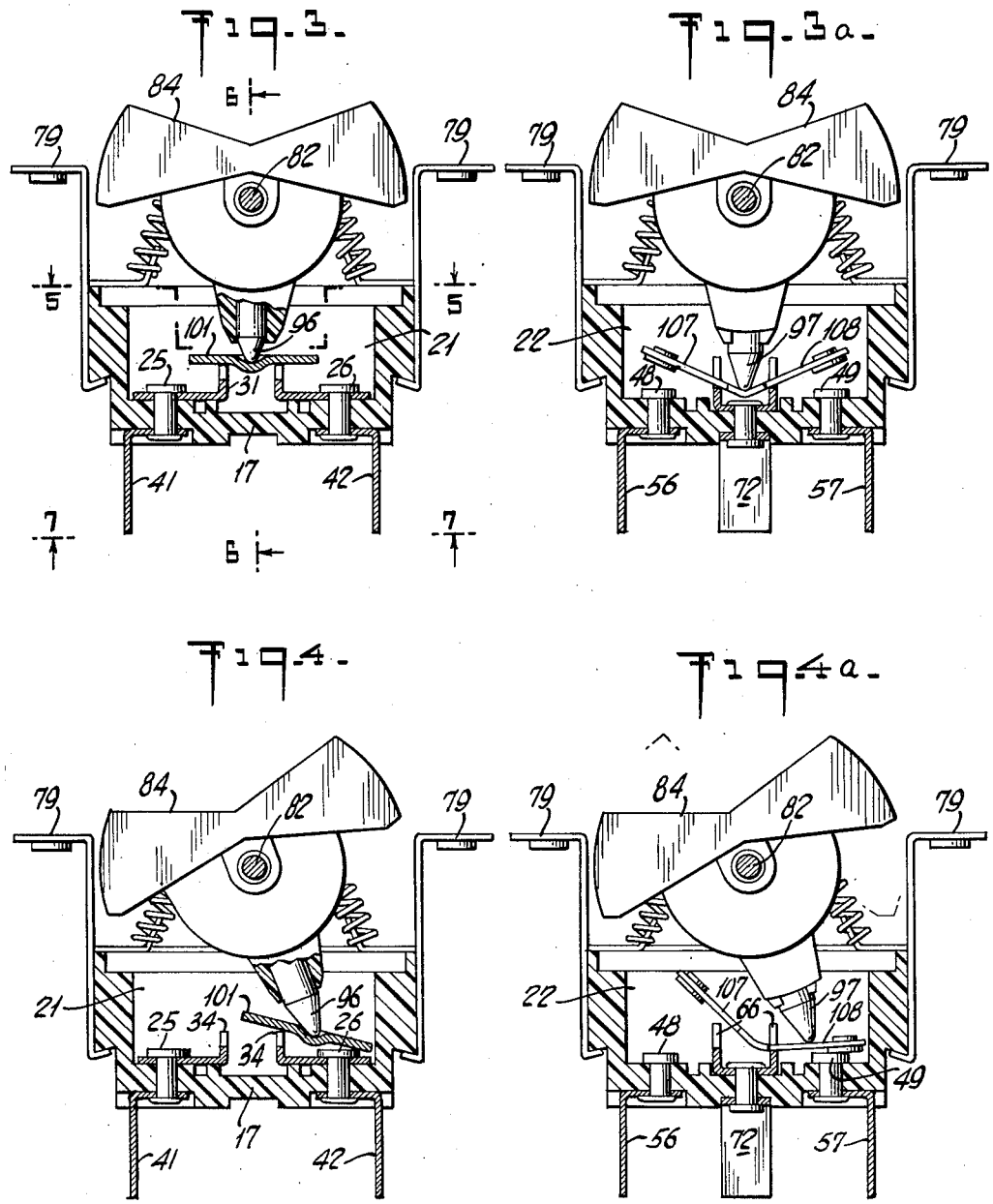

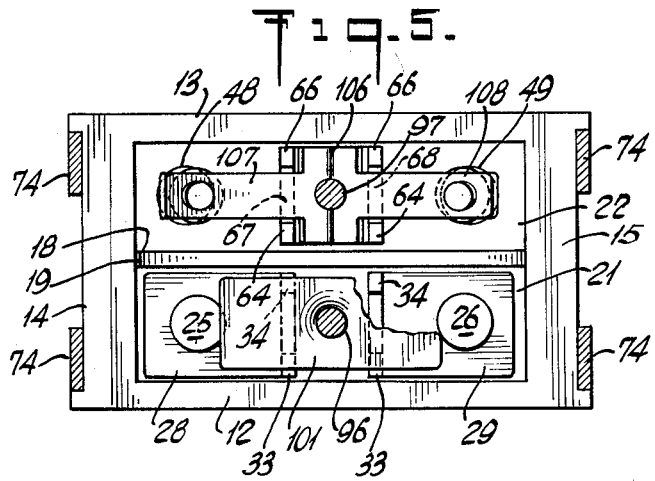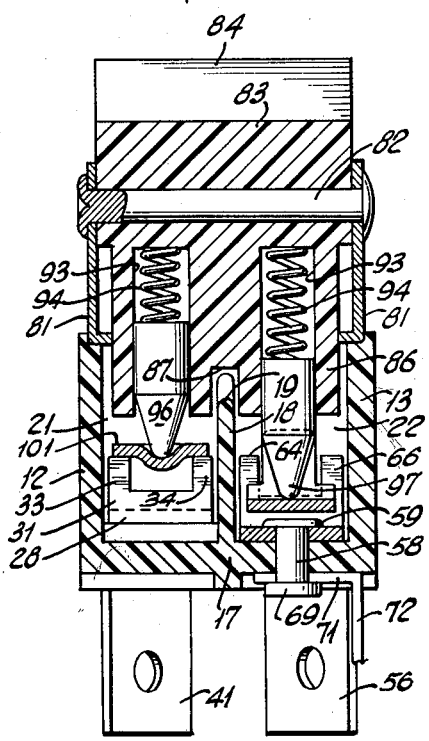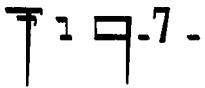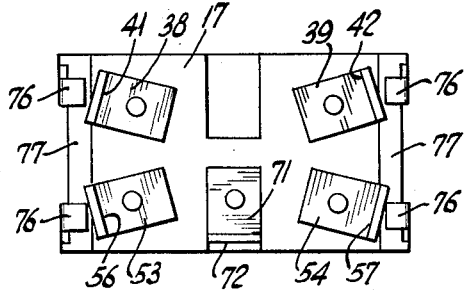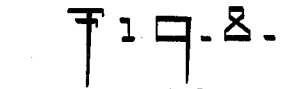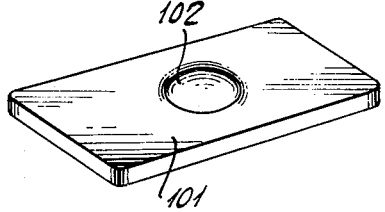

United States Patent Office 3,165,604
Patented Jan. 12, 1965

3,165,604
THREE-POSITION SINGLE TOGGLE ACTUATED SWITCH FOR TWO INDEPENDENT ELECTRICAL CIRCUITS
Wesley T. Sorenson, West Hartford, Conn., assignor to Carling Electric, Inc., West Hartford, Conn., a corporation of Connecticut
Filed Feb. 26, 1963, Ser. No. 260,991
10 Claims. (Cl. 200—67)

This invention relates to circuit selectors and more particularly to a novel switch whose single actuator is operable selectively in three positions to control three separate electrical circuits.

In some electrical circuit arrangements, it is desirable, for reasons of economy or limitations of space, to control three separate circuits with a single selector actuator. Although such a problem could ordinarily be solved with an involved arrangement of complex circuit elements, the device of the present invention accomplishes this result inexpensively by the utilization of simple, conventional elements assembled in a new structural combination.

Arranged, side by side, are two sets of circuit elements: one set operating as a "center-off" switch which selectively controls two separate electrical circuits; the other set operating as a "center-on" switch that controls a single electrical circuit.

Both sets of circuit elements are operated by a single actuator element movable from a center position in opposite directions to either of two other positions. In each of the three actuator positions, the one selected electrical circuit is closed while the other two are in the open circuit condition.

By devising a "center-on" three position single circuit switch which, in itself, would seem to be an anomaly, combining it with the classic "center-off," three position, two circuit selector switch, and operating both switches simultaneously with a single three position actuator element, the principle object of providing a three circuit, three position, single actuator switch has been achieved.

Still other objects and advantages of the inevntion will be apparent from the specification.

The features of novelty which are believed to be characteristic of the invention are set forth herein and will best be understood, both as to their fundamental principles and as to their particular embodiments, by reference to the specification and accompanying drawings, in which:

FIGURE 1 is a perspective view of the switch of the present invention;

FIG. 2 is a greatly enlarged vertical partial section view taken along one portion of the switch shown in FIG. 1, some parts being shown in elevation and some parts being omitted;

FIG. 2a, is a view similar to FIG. 2, taken along another portion of said switch, some parts being shown in elevation and some parts being omitted;

FIG. 3 is a view similar to FIG. 2, somewhat reduced in size, showing the actuator button and other corresponding parts in the central position;

FIG. 3a, is similar to FIG. 2a, somewhat reduced in size, showing the actuator button and other corresponding parts in the central position;

FIGS. 4 and 4a, are views comparable to FIGS. 3 and 3a, showing the actuator button and the other corresponding parts tipped in the direction opposite to that shown in FIGS. 2 and 2a;

FIG. 5 is a view taken on line 5—5 of FIG. 3;

FIG. 6 is a view taken on line 6—6 of FIG. 3;

FIG. 7 is a view taken on line 7—7 of FIG. 3; and

FIG. 8 is a greatly enlarged view of the contact lever shown in FIGS. 2, 3 and 4.

Referring now to the drawings in detail, the switch of the present invention comprises a case, generally designated 11, formed or molded of a suitable insulating material such as Bakelite, nylon, or the like, into a box-like shape, as shown in FIGURE 1. Case 11 comprises a pair of side walls 12 and 13 and a pair of end walls 14 and 15, all of which are bounded on the bottom by floor 17. On the interior of case 11 and extending from end wall 14 to the end wall 15 is an integrally formed partition 18, the upper edge 19 of which is arcuate in shape. See FIGURES 2, 3, 4 and 6. Partition 18, which is also bounded by floor 17, divides the interior of case 11 into two separate circuit selecting chambers 21 and 22 in which separate sets of contact elements and corresponding contact levers are operable.

Extending through floor 17 of case 11, in the region of chamber 21, is a pair of spaced apart electrically conductive studs 23 and 24 (FIG. 2). The upper ends of said studs 23 and 24 have integrally formed contact heads 25 and 26, each of which secures an electrically conductive bar 28 and 29, respectively, to floor 17 in the interior of chamber 21. Bars 28 and 29 extend toward each other and terminate in respective upwardly extending spaced apart arms 31 and 32. Arms 31 and 32 each have a pair of spaced apart upwardly extending fingers 33 and 34 whose function will be described hereinafter  See also FIGS. 5 and 6.

The lower ends of studs 23 and 24 terminate in rivet heads 36 and 37, respectively, each of which secures a respective electrically conductive bracket 38 and 39. Brackets 38 and 39 each have downwardly extending integrally formed terminal lugs 41 and 42, respectively.

Extending through floor 17 of case 11, is a second pair of electrically conductive spaced apart studs 46 and 47, the upper ends of which terminate in respective contact heads 48 and 49 which extend into the interior of chamber 22. See FIG. 2a. The lower ends of studs 46 and 47 terminate in respective rivet heads 51 and 52 each of which secures a corresponding electrically conductive bracket 53 and 54 to the bottom of floor 17. Brackets 53 and 54 each have integrally formed downwardly extending terminal lugs 56 and 57 resepectively, which are connectable to separate electrical circuits.

Also extending through floor 17 intermediate studs 46 and 47 is an electrically conductive stud 58, the upper end of which has an integral rivet head 59 positioned in the interior of chamber 22. Secured by rivet head 59 to floor 17 is an electrically conductive yoke 61 which has a pair of integrally formed, spaced apart, upwardly extending arms 62 and 63. Arms 62 and 63 each have a pair of upwardly extending spaced apart fingers 64 and 66. Between each pair of fingers 64 and 66, arms 62 and 63 each have horizontal shoulders 67 and 68, respectively, whose function will be described hereinafter.

The bottom of stud 58 terminates in an integrally formed rivet head 69 which secures an electrically conductive bracket 71 to the bottom of floor 17. Bracket 71 has an integrally formed downwardly extending terminal lug 72 which is connectable to a power line that is common to both separate circuits connected to terminal lugs 56 and 57, respectively.

Positioned across the open top of case 11 is a mounting plate 73 made of sheet metal or the like. Integrally formed at each end of plate 73 is a pair of downwardly extending spaced apart legs 74, each of which terminates in a hook 76 bent inwardly and upwardly to engage a spur 77 integrally formed in each end wall 14 and 15 of case 11 for retaining said plate securely in position. Integrally formed at each end of plate 73 is an upwardly extending arm 78 which terminates in an outwardly extending bracket 79 for mounting the switch assembly in a suitable operating location. Each side of plate 73 has an integrally formed upwardly extending mounting element 81 of triangular shape, each of said elements having an aperture near its apex for supporting the opposite ends of pivot pin 82.

Pivotally mounted on pin 82 is an actuator button 83 molded or otherwise formed of a suitable insulating material such as Bakelite, nylon, or the like. Button 83 has a pair of intersecting actuating wings 84 which are arrayed at an obtuse angle in respect of each other and which terminate in downwardly extending respective bows 85. Button 83 has an integral downwardly extending stud 86, the lower portion of which extends freely, through and moves laterally back and forth within a central aperture in plate 73 and within the interior of case 11. The lower end portion of the bottom surface of stub 86 has a slot 87 which freely accommodates without contact the upper edge portion of partition 18 when said stub moves freely back and forth within the interior of case 11. (See FIG. 6.)

On both sides of pivot pin 82, button 83 has a pair of parallel vertical recesses 88 each of which freely accommodates a portion of spring 89, FIGS. 1 and 2. The upper end of each spring 89 engages an integral extension 91 on the bottom portion of wing 84, while the other end of said spring is engaged by a tongue 92 upset from a portion of plate 73.

The central portion of button 83 also has a pair of parallel recesses 93, each of which longitudinally accommodates a respective spring 94, FIGS. 1 and 6. Recesses 93 also slidably accommodate nibs 96 and 97, respectively, each of said nibs having a hollow recess 98 which accommodates the lower end of respective spring 94 which normally urges said nib downwardly. Slidable across the top of fingers 33 and 34 in chamber 21 is a contact lever 101. FIGS. 2, 5, 6 and 8. Contact lever 101 has a central depression 102 which is engaged by the lower rounded end of nib 96 under the action of spring 94. Upon the pivoting motion of button 83, nib 96 urges contact lever 101 slidably and pivotably into any selected one of the three positions shown in FIGS. 2, 3 and 4.

Since terminal lugs 41 and 42 are connected in series in a single electrical circuit, the pivoting of button 83 into the tilted position shown in FIG. 2, would cause contact lever 101 to be located in an open circuit condition. When button 83 is positioned at an angle in the opposite direction, as shown in FIG. 4, the same open circuit condition obtains.

When, however, button 83 is in the vertical position as shown in FIGS. 3 and 5, contact lever 101 bridges fingers 33 and 34 and closes the circuit between terminal lugs 41 and 42. Thus, as far as the elements in chamber 21 are concerned, the device herein operates as a three-position "center-on" switch for a single circuit.

In chamber 22 of case 11, a V-shaped electrically conductive contact lever 106 is pivotable on shoulders 67 and 68 of yoke 61 by means of yieldable nib 97 into any one of three different circuit positions as shown in FIGS. 2a, 3a and 4a. Lever 106 has a pair of oppositely extending contact arms 107 and 108, the ends of which make electrical connection with contact heads 48 and 49, respectively.

When button 83 is in the central position, as shown in FIG. 3a, nib 97 bears down upon the apex of lever 106 whereby the latter is urged against both shoulders 67 and 68, whereby contact arms 107 and 108 are spaced apart from their corresponding contact heads 48 and 49, respectively. In this position, the two separate circuits to which terminal lugs 56 and 57 are connected are in the open circuit position.

When button 83 is moved into the position as shown in FIG. 2a, nib 97 has caused lever 106 to move pivotally until contact arm 107 electrically bridges shoulder 67 and contact head 48, while contact arm 108 is spaced apart from contact head 49. Accordingly, the circuit is closed only between the leads connected to terminal lugs 56 and 72.

When button 83 is moved pivotally into the opposite position, as shown in FIG. 4a, contact arm 108 electrically bridges shoulder 68 and contact head 49 while contact arm 107 is spaced apart from contact head 48, thereby closing the circuit between terminal lugs 72 and 57. Thus, as far as the elements in chamber 22 are concerned, the device herein operates as a three-position, "center-off" selector switch for two separate circuits.

Since the circuit elements in both chambers 21 and 22 are both operated simultaneously by the same actuator button 83, the device of the present invention is capable of selectively controlling three separate circuits when said button is moved into any of three corresponding circuit positions as shown in paired FIGS. 2, 2a, FIGS. 3, 3a, and FIGS. 4, 4a. In FIGS. 2, 2a, only the circuit connected to lugs 56 and 72 is electrically closed; in FIGS. 3, 3a, only the circuit connected to lugs 41 and 42 is electrically closed; and in FIGS. 4, 4a, only the circuit connected to lugs 57 and 72 is electrically closed.

Button 83 is indexed into the three different circuit positions by the combined actions of springs 89 operating on both wings 84 of said button, and of captive springs 94 which cause nibs 96 and 97 to bear yieldably upon contact levers 101 and 106, respectively. The tensions of said springs are selected not only to perform their combined indexing function but also to permit the pivoting movement of said button with suitable operating ease.

In some embodiments the function of button 83 may be performed by the substitution of other suitable actuators such as sliders, toggle handles, and the like.

What is claimed is:

1. A switch assembly comprising a first group of circuit elements for controlling a first electrical circuit, a second group of circuit elements for selectively controlling a second electrical and a third electrical circuit, said first circuit being independent of said second and third circuit and a single actuator operating both of said groups of circuit elements, said actuator being operable in a center position to close the first electrical circuit only, said actuator being operable alternatively in positions on either side of said center position only to selectively close either of said second and third electrical circuits, respectively.

2. An electrical apparatus comprising a first switch for controlling a first electrical circuit, a second switch for selectively controlling second and third electrical circuits, said first circuit being independent of said second and third circuit and a single three position actuator for operating both of said switches, said actuator operating in the central of its three positions to close said first circuit and to maintain both said second and third circuits in the open circuit condition.

3. Electrical apparatus comprising a case, an actuator movable into three selected positions relative to said case, one of said positions being central intermediate the other two positions, a first switch in said case for controlling a first electrical circuit, and a second switch in said case for selectively controlling second and third electrical circuits, said first circuit being independent of said second and third circuits said actuator operating both of said switches, said actuator in its center position causing said first switch to close said first circuit only, said actuator in either of its other two positions causing said second switch selectively to close either said second or third circuits, respectively, both of said second and third circuits being in the open circuit condition when said actuator is in the center position.

4. Electrical apparatus comprising a first three-position "center-on" switch controlling a first single circuit, a three-position second "center-off" switch selectively controlling second and third circuits, said first circuit being independent of said second and third circuit and a single actuator connected to and operating both of said switches.

5. Apparatus according to claim 4 wherein said actuator is selectively movable to and from a center position relative to two other circuit selecting positions on either side of said center position.

6. An electrical apparatus comprising a first switch for controlling a first electrical circuit, a second switch for selectively controlling second and third electrical circuits, said first circuit being independent of said second and third circuit and a single actuator for operating both of said switches, said actuator being selectively positionable in three locations and operating in the central of said locations to close said first circuit only and in the other two locations to selectively close said second and third circuits, respectively, said first circuit being in the open circuit condition when said actuator is in either of said other two locations.

7. Apparatus according to claim 6 and further comprising a first contact element in said first switch yieldably urged by said actuator into and out of a circuit closing position for said first circuit, and a second contact element in said second switch yieldably urged by said actuator into and out of circuit closing positions of said second and third circuits.

8. A switch comprising a case, a first pair of spaced apart circuit elements in said case, said circuit elements being connectable in series to control a first electrical circuit, a second pair of spaced apart circuit elements in said case, each of said second pair of elements being connectable, respectively, to second and third electrical circuits, a common circuit element positioned intermediate said circuit elements of said second pair, each element of said second pair of elements being separately connectable to said common circuit element, an actuator mounted on said case, said actuator being movable into any one of three selected positions, one of said positions being intermediate the other two, a first movable contact element operated by said actuator into three separate positions, said first contact element establishing electrical connection between said first pair of circuit elements only when said actuator is in the center position, and a second movable contact element on said common circuit element and operated by said actuator into three separate positions, said second contact element being in an open circuit condition when said actuator is in the center position, said second contact element establishing electrical connection with either one of said second pair of circuit elements according as said actuator is moved into either of its positions other than the central position.

9. A switch according to claim 8 and further comprising a first spring mounted between said actuator and said first contact element and a second spring mounted between said actuator and said second contact element, said spring elements acting in conjunction to index said actuator in its three separate circuit closing positions.

10. A switch comprising a case, a first pair of spaced apart circuit elements in said case, said circuit elements being connectable in series to control a first electrical circuit, a second pair of spaced apart circuit elements in said case, each of said second pair of elements being connectable, respectively, to second and third electrical circuits, a common circuit element positioned intermediate said circuit elements of said second pair, each element of said second pair of elements being separately connectable to said common circuit element, an actuator mounted on said case, said actuator being movable into any one of three selected positions, one of said positions being central of the other two positions, a first contact element yieldably and movably urged relative to said first pair of circuit elements, said first contact element being located to close the circuit between said first pair of said circuit elements when said actuator is in its central position and to cause an open circuit condition between said first pair of elements when said actuator is in either of its other two positions, a second contact element pivotally mounted on said common circuit element and yieldably moved by said actuator relative thereto, said second contact element maintaining an open circuit condition relative to both of the circuit elements of said second pair when said actuator is in its central position and closing the circuit selectively with either one or the other of said second pair of circuit elements when said actuator is in either of its positions other than its central position.

References Cited by the Examiner
UNITED STATES PATENTS

| | | | |
|---|---|---|---|
| 1,912,623 | 6/33 | Douglas | 200—67 |
| 2,969,442 | 1/61 | Benander et al. | 200—6 |

BERNARD A. GILHEANY, Primary Examiner.

ROBERT K. SCHAEFER, Examiner.